2,757,199

PRODUCTION OF OPTICALLY ACTIVE ALPHA-METHYL BUTYRALDEHYDE

Halbert C. White and John C. Vander Weele, Midland, Mich., assignors to The Dow Chemical Company, Midland, Mich., a corporation of Delaware No Drawing. Application January 22, 1953,
Serial No. 332,768

6 Claims. (Cl. 260—603)

This invention concerns an improved method of oxidizing D-2-methyl-1-butanol to obtain D-alpha-methylbutyraldehyde.

Ehrlich, Ber. 40 2556 (1907), oxidized optically active amyl alcohol (from fusel oil) by adding thereto a mixture of sodium chromate and sulphuric acid while heating the alcohol to boiling, whereby D-alpha-methylbutyraldehyde was obtained in about 25 per cent yield. It will be noted that Ehrlich's step of oxidizing the optically active alcohol to the aldehyde was carried out in liquid phase, using a chemical oxidizing agent, at the boiling temperature of the alcohol, i. e. at about 128° C. Guye, Bull. Soc. Chim. (3) 25 548 (1901), teaches that the optically active valeraldehyde, i. e. D-alpha-methyl-butyraldehyde, undergoes racemization upon being heated at 150° C. in a sealed tube. Ehrlich's temperature for oxidizing alcohol to the aldehyde is below that at which Guye shows the optically active aldehyde to undergo racemization.

We have found that the optically active amyl alcohol, D-2-methyl-1-butanol, can conveniently be oxidized by reaction in vapor phase with oxygen or an oxygen-containing gas, e. g. air, at temperatures in the order of from 400° to 550° C. and in the presence of metallic silver as a catalyst to obtain the optically active aldehyde, D-alpha-methylbutyraldehyde, in good yield. The reason why extensive racemization, particularly of the aldehyde, does not take place at such high reaction temperatures is not known. It has been observed that when a different kind of a solid oxidation catalyst was used in place of the metallic silver and the oxidation was carried out in vapor phase under otherwise similar conditions, the alpha-methylbutyraldehyde which was obtained was almost completely racemized. Accordingly, it appears that the stability of the optically active form of alcohol, and of the aldehyde, against becoming racemized during the oxidation at high temperatures is to be attributed, at least in part, to use of metallic silver as a catalyst for the oxidation reaction. The avoidance of racemization may also be due in part of the fact that the oxidation is carried out in vapor phase.

In the production of D-alpha-methyl-butyraldehyde from D-2-methyl-1-butanol, the latter is vaporized. Streams of the alcohol vapors and of an oxygen-containing gas, such as oxygen or air, are admixed in proportions corresponding to not more than 0.8, e. g. from 0.2 to 0.8 and preferably from 0.3 to 0.4, molecular equivalent of free oxygen per mole of the alcohol and the vapor mixture is passed into contact with metallic silver at a reaction temperature in the order of from 400° to 550° C., preferably from 500° to 525° C. Usually, the vapors are passed first through a preheating zone where they are heated to approach the reaction temperature and then through a body of small pieces, or filaments, or metallic silver. The silver is usually employed in granular form, but it may be used as metal shavings, turnings, or as one or more silver screens, etc. In some instances, cooling may be necessary to avoid excessive heating due to the heat of reaction. This may be accomplished in usual ways, e. g. by use of an inert diluent gas in the vapor feed mixture, or by external cooling of the reaction zone, etc. The rate of vapor flow may be varied widely, the optimum rate being dependent upon the proportions of oxygen and inert gases, e. g. nitrogen, in the mixture, and the reaction temperature. In all instances, the reaction temperature and the rate of vapor flow are controlled so as to avoid thermal decomposition of as much as 30 per cent of the 2-methyl-1-butanol and alpha-methylbutyraldehyde components of the mixture. If, on sampling and analyzing the products, it is found that as much as 30 per cent of the 2-methyl-1-butanol is being lost due to formation of products other than the alpha-methylbutyraldehyde, the reaction temperature is lowered or the rate of vapor flow is increased. Vapors flowing from the reaction zone are cooled to condense the organic products. The condensate consists for the most part of water, the unreacted D-2-methyl-1-butanol and optically active valeraldehyde, i. e. D-alpha-methyl-butyraldehyde. The latter is separated by fractional distillation and usually distills as an azeotrope together with water at a temperature of about 77° C. at atmospheric pressure. The aqueous D-alpha-methylbutyraldehyde, thus obtained, is suitable for direct use, e. g. as an agent for the manufacture of L-isoleucine. However, it may, when desired, be dried in usual ways, e. g. by treatment with drying agents such as anhydrous sodium sulphate, or calcium chloride, etc.

The following example describes a way for practice of the invention, but is not to be construed as limiting its scope.

Example 1

A vapor mixture of 9.7 gram moles of D-2-methyl-1-butanol (recovered from fusel oil and having a light rotation value of $[\alpha]_D^{25} = -5.77$) and air in amount containing approximately 5.8 gram moles of oxygen was passed in 7 hours and at temperatures between 480° and 520° C. through a stainless steel tube 1 foot long and of 1 inch internal diameter and packed with silver pellets. Vapors flowing from the tube were cooled to condense water and the organic products. The condensate was fractionally distilled to obtain an azeotropic mixture of about 90 per cent by weight of D-alpha-methylbutyr-aldehyde and 10 per cent water, which azeotrope distilled at approximately 77° C. at atmospheric pressure. In the distillation there was obtained 4.94 gram moles of the D-alpha-methylbutyraldehyde, principally as such azeotrope, and 2.94 gram moles of unreacted D-2-methyl-1-butanol. The D-alpha-methylbutyraldehyde had a light rotation value of $[\alpha]_D^{25} = +33.50$. The yield of D-alpha-methylbuytraldehyde was 73 per cent of theoretical, based on the alcohol consumed in the reaction.

This application is a continuation-in-part of our co-pending application, Serial No. 157,408, filed April 21, 1950, and now abandoned. In said co-pending application it is disclosed that the D-alpha-methylbutyraldehyde, obtainable by the method of the present invention, may be reacted with an aqueous mixture of an alkali metal cyanide and ammonium carbonate or ammonium bicarbonate to form 5-(sec-butyl)hydantoin and that the latter may be hydrolyzed to obtain a mixture of isomeric amino acids which is richer in the essential amino acid, L-isoleucine, than is the amino acid mixture obtained in similar manner, except for use of racemic alpha-methylbutyraldehyde as the aldehyde starting material.

We claim:

1. A method of making D-alpha-methylbutyraldehyde which comprises passing a vapor mixture of D-2-methyl-1-butanol and from 0.2 to 0.8 of its molecular equivalent of free oxygen into contact with metallic silver at temperatures between 400° and 550° C.

2. A method which comprises passing a vapor mixture of D-2-methyl-1-butanol and an oxygen-containing gas comprising from 0.2 to 0.8 molecular equivalent of free oxygen per mole of the D-2-methyl-1-butanol into contact with metallic silver at reaction temperatures between 400° and 550° C., whereby D-alpha-methylbutyraldehyde is formed, cooling the effluent reaction vapors to condense water and the organic products and distilling a mixture of water and D-alpha-methylbutyraldehyde from the condensate.

3. A method as claimed in claim 2, wherein the oxygen-containing gas is air.

4. A method, as claimed in claim 3, wherein air is fed to the reaction in a proportion containing from 0.3 to 0.4 molecular equivalent of oxygen per mole of the D-2-methylbutanol in the feed mixture.

5. A method, as claimed in claim 2, wherein the oxygen-containing gas is free oxygen.

6. A method, as claimed in claim 5, wherein the feed mixture contains from 0.3 to 0.4 molecular equivalent of free oxygen per mole of the D-2-methylbutanol.

References Cited in the file of this patent

UNITED STATES PATENTS

| | | |
|---|---|---|
| 1,968,552 | Bond et al. | July 31, 1934 |
| 2,005,645 | Bond et al. | June 18, 1935 |
| 2,123,520 | Babcock et al. | July 12, 1938 |